No. 683,253.  
P. J. DARLINGTON.  
ELECTRIC GENERATOR OR MOTOR.  
(Application filed Aug. 15, 1898.)

Patented Sept. 24, 1901.

(No Model.)

4 Sheets—Sheet 1.

Witnesses  
R. A. McKimber  
Arthur T. Baker

Inventor  
Philip J. Darlington  
Per  
Attorney  
John N. Swan

No. 683,253.   Patented Sept. 24, 1901.
P. J. DARLINGTON.
ELECTRIC GENERATOR OR MOTOR.
(Application filed Aug. 15, 1898.)

(No Model.)  4 Sheets—Sheet 2.

No. 683,253. Patented Sept. 24, 1901.
P. J. DARLINGTON.
ELECTRIC GENERATOR OR MOTOR.
(Application filed Aug. 15, 1898.)
(No Model.) 4 Sheets—Sheet 3.

No. 683,253. Patented Sept. 24, 1901.
P. J. DARLINGTON.
ELECTRIC GENERATOR OR MOTOR.
(Application filed Aug. 15, 1898.)
(No Model.) 4 Sheets—Sheet 4.
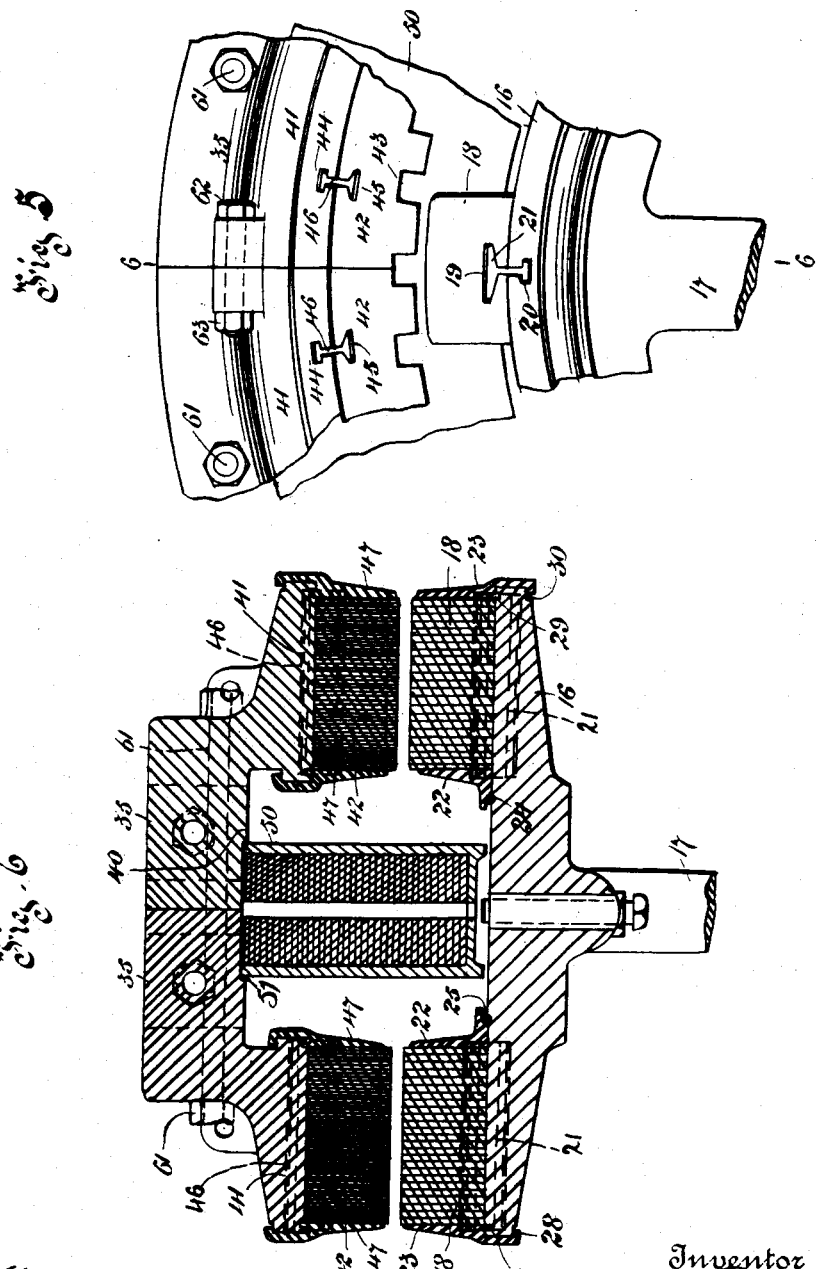
Witnesses
Inventor
Philip J. Darlington
By his Attorney

UNITED STATES PATENT OFFICE.

PHILIP J. DARLINGTON, OF MONTREAL, CANADA.

ELECTRIC GENERATOR OR MOTOR.

SPECIFICATION forming part of Letters Patent No. 683,253, dated September 24, 1901.

Application filed August 15, 1898. Serial No. 688,595. (No model.)

*To all whom it may concern:*

Be it known that I, PHILIP J. DARLINGTON, of the city of Montreal, Province of Quebec, Canada, have invented certain new and useful Improvements in Electric Generators or Motors; and I do hereby declare that the following is a full, clear, and exact description of the same.

The object of my invention is to so construct an electric generator or motor that the interior parts thereof will be fully accessible without the necessity of lifting any part of the generator or motor, and, furthermore, to obviate the use of the complicated means heretofore employed for connecting the laminæ of the laminated portions together and to their carrying parts.

To these ends the invention may be said, briefly speaking, to consist in, first, dividing the stationary armature of an electric generator or motor in a plane at right angles to the axis of the inductor and adapting either or both of said divided parts to be moved axially away from said inductor, thereby exposing the armature-coils, field-coils, and inductor-poles; secondly, in adapting the inductor to be axially adjustable in either direction, and, thirdly, in providing a series of clips of novel construction adapted to hold the plates of the laminated portions together and, in conjunction with a series of keys, secure them to their carrying parts, these keys being so formed that each will engage and hold together the adjacent edges and faces, respectively, of a series of the said plates and their carrying parts.

For a full comprehension, however, of my invention reference must be had to the accompanying drawings, forming a part of this specification, in which like symbols indicate the same parts, and wherein—

Figure 1:
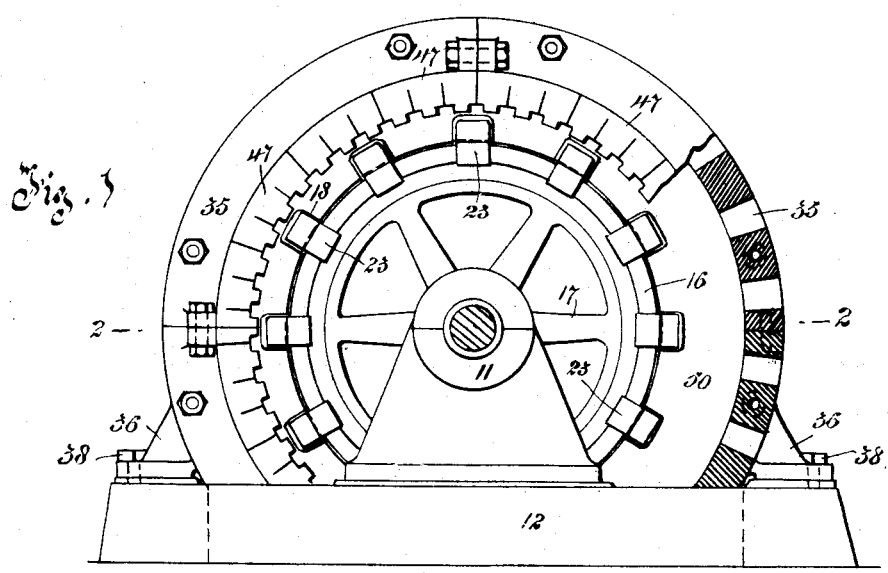
Figure 2:
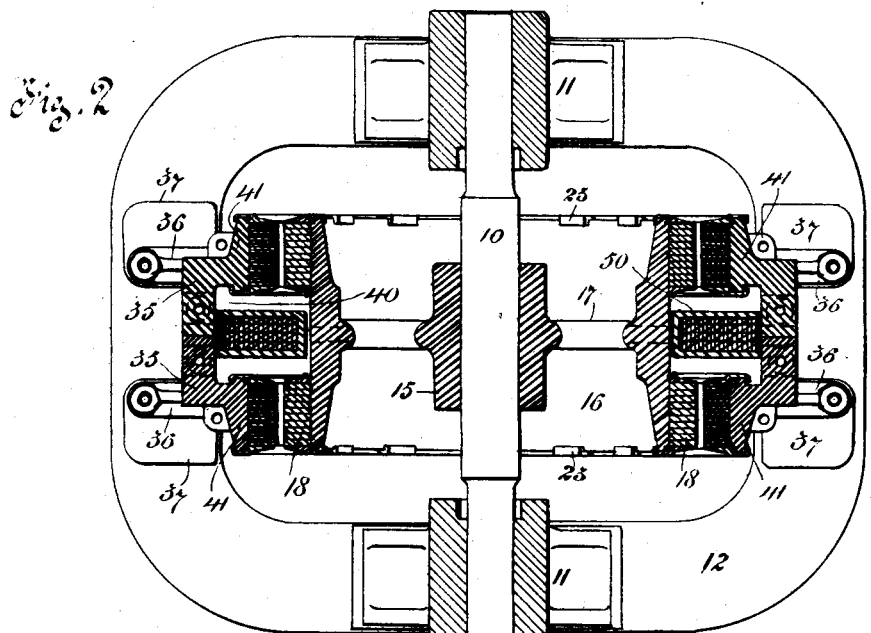
Figure 3:
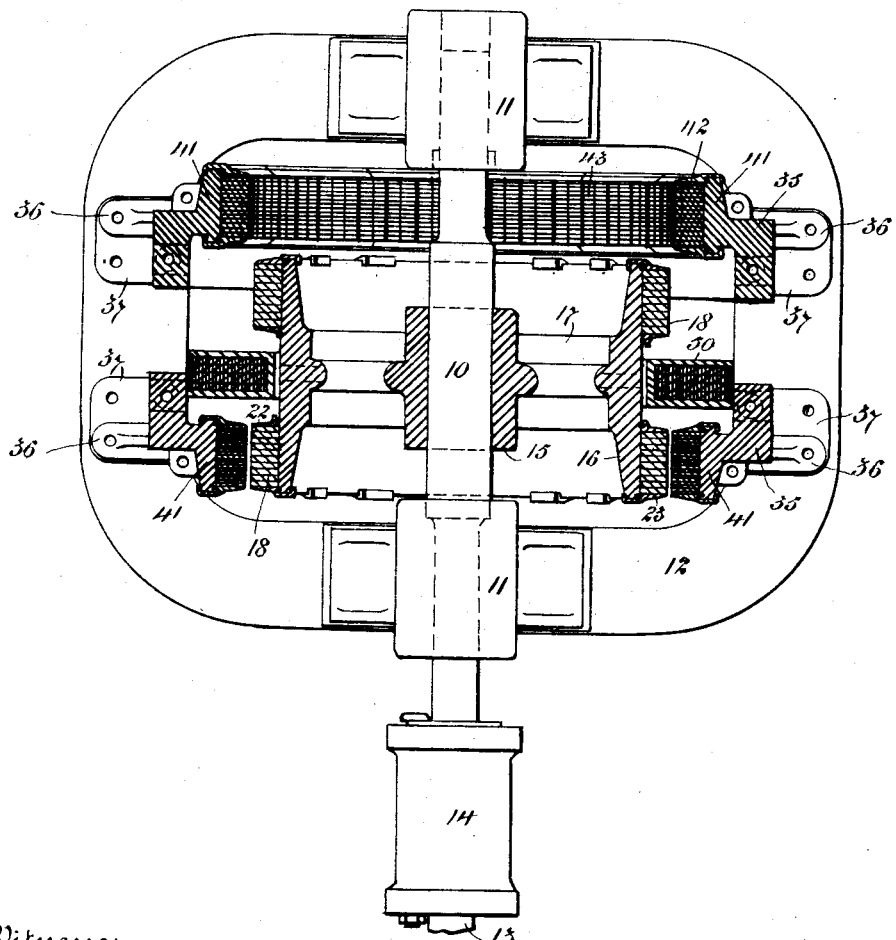
Figure 4:
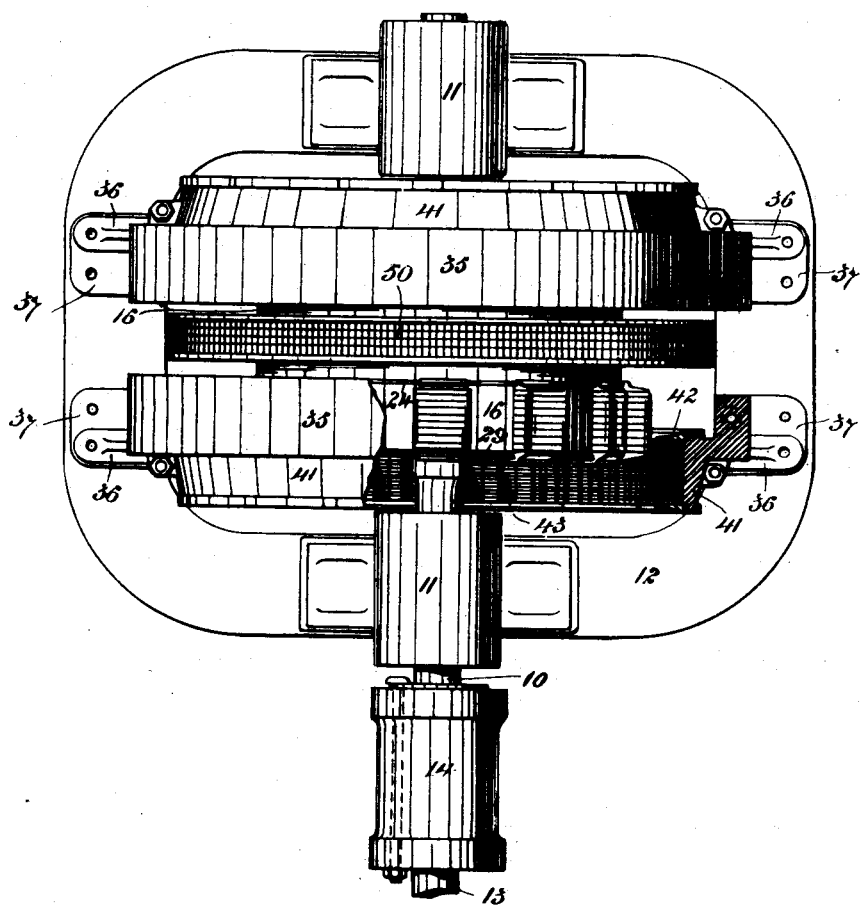

Figure 1 is a side elevation, partly in section, of an electric generator or motor constructed according to my invention; Fig. 2, a horizontal sectional view thereof, taken on line 2 2, Fig. 1, and showing the parts thereof in working position. Fig. 3 is a similar view, but illustrating the parts in a position to allow of the inspection of one set of armature-coils. Fig. 4 is a plan view illustrating the parts in a position to allow of the inspection or repair of the field-coils; Fig. 5, an enlarged detail side elevation of a portion thereof with the clips removed; and Fig. 6 is an enlarged transverse vertical section view taken on line 6 6, Fig. 5.

I have not illustrated and will not describe in full the various windings, terminals, and other details of construction to which my invention does not relate, but only such parts as are necessary to the complete understanding of my invention.

In constructing a motor according to the preferred embodiment of my invention I mount the inductor rigidly upon a shaft 10, diminished in thickness at each end and adapted when occasion requires to slide in bearings supported in pillow-blocks 11 on a rigid base 12, said shaft being connected to the shaft 13 to be driven by a coupling 14.

The inductor consists of a hub 15 and rim 16, connected together by spokes 17, the rim being extended in width to carry two sets of pole projections, one set on each end of its outer cylindrical surface. These pole projections are built up of a series of plates 18, having their inner edges provided with registering T-shaped slots 19 and conforming to the shape of the rim, while their outer edges are concentric to said rim and have their corners rounded. (See Fig 5.) A series of inverted-T slots 20 are cut in the outer surface of the inductor-rim transversely thereof at suitable distances apart, and the slots 19 register with these slots 20 and conjointly therewith form I-slots, in which I-shaped keys 21 are inserted to retain the laminated pole projections against radial displacement. These pole projections are, as before mentioned, located adjacent to each side edge of the inductor-rim. A space between them to accommodate the field-coil, to be hereinafter described, is provided. A series of clips 22 and 23 retain these pole projections against displacement laterally of the rim at their inner and outer ends, respectively. The clips 22 are angular-shaped in cross-section and have their outer lower corners notched to register with a peripheral groove 24 in the outer surface of the inductor-rim, in which groove a series of keys 25, circular in cross-section, take and prevent the lateral displacement of said clips 22 longitudinally of the pole projection. The clips 23 are of bayonet form in cross-section and recessed at the lower ends of their inside faces to form projecting flanges 27 and 28 to fit into circumferential recesses 29 and 30, respectively, cut in the outer and inner faces of the inductor-rim adjacent to the edges thereof.

The inductor rotates within an armature stationary during the operation of the motor and divided to allow of its parts being moved away from one another and from the inductor to enable said parts and inductor to be conveniently and fully inspected when desired or repaired when necessary.

The armature comprises a cast-iron or steel yoke divided in a plane at right angles to the shaft into two portions 35, provided with feet 36, adapted to rest upon pads or planed surfaces 37 on the top of the base 12, to which pads said feet are detachably connected by screw-bolts 38. This base is of greater width than the total width of the armature, and said pads are equal in width to the combined width of said feet and the difference between the total width of the armature and the space therebetween and the adjacent faces of the pillow-blocks. This complete yoke is in the form of an annulus and has a central circumferential recess 40 on the inside thereof to accommodate the field-coil, (to be presently described,) thus providing a pair of centripetal extensions 41, which are extended to a width equal to the length of the pole projections of the inductor. Upon each of these centripetal extensions a laminated ring having its inner surface axially grooved, as at 43, is built up of a series of sheet-iron segments 42, having their inner edges notched to form said grooves 43, while the inner face of said extensions and the adjacent faces of said laminated rings are provided with registering slots 44 and 45, respectively, (similar to the slots 19 and 20,) to receive keys 46, similar to the key 21. These laminated rings are held against lateral displacement by means of a series of clips 47, similar in cross-section to the clips 23. These clips 47 each consist of a series of segments separated radially by sufficient space to enable them to be slipped into place. The armature-coils (not shown) may be separately wound (of wire or strips) and fitted into the grooves 43 of the laminated armature-rings, the ends of said coils being suitably connected together and supplied with terminals to form the armature-windings of the machine.

The field-spool 50 is stationary during the operation of the machine and rests upon the armature-yoke in a circumferential groove between the centripetal extensions and consists, as usual, of a coil of wire or strips wound into an annular bobbin of sufficient radial width to extend between the laminated armature-rings and the two sets of laminated conductor-poles, this coil being of course supplied with suitable terminals to form the exciting-circuit of the motor.

The portions of the armature-yoke are connected together by screw-bolts 61, taking through borings transversely therethrough and receiving nuts on their ends, while the yoke is preferably divided into segments to facilitate handling the motor in shipment, said segments being connected rigidly together by screw-bolts 62 and nuts 63.

The armature-coils, field-coil, and inductor-poles of a motor or generator constructed according to the foregoing are fully accessible without lifting any of the parts thereof by simply removing the screw-bolts 38 and 61 from the feet and yoke portions, respectively, of the armature and loosening the coupling 14, after which, if it is desired to have access for inspection or repairs to the armature-windings or laminated ring carried by, say, the left-hand portion of the yoke, said portion should be moved from the position shown in Fig. 2 to that shown in Fig. 3 and the other half, with the field-coil and the inductor moved in the opposite direction, as also shown in said figures; the field-spool being then supported by the right-hand portion; or if it is desired to expose the field-spool the portions of the yoke alone should be moved in opposite directions, thus removing their support from the field-spool and allowing it to drop down and hang upon the inductor, which will not have been moved. (See Fig. 4.) The inductor, and with it the field-spool, can then be revolved slowly by special means for the purpose of repairing the field-spool, if necessary.

It is obvious that the frame of a generator or motor constructed according to the foregoing can be increased in width and the shaft and inductor held permanently against longitudinal movement and other changes made without departing from the spirit of my invention.

What I claim is as follows:

1. An electrical generator comprising a stationary armature-frame consisting of an annular yoke; a pair of laminated rings built up upon the interior of said yoke one adjacent to each side thereof and having a space between them; means for retaining said laminated rings against displacement; an axially-movable rotary inductor comprising an annular series of pole projections located near each end thereof and in the same planes as said laminated rings; a field-spool located between said laminated rings and of sufficient width to project between said series of pole projections, said yoke being divided in a plane at right angles to its axis and on a line midway of the axial length of the space between the laminated rings, the divided parts being movable away from and toward one another, substantially as described and for the purpose set forth.

2. In an electric generator or motor, a stationary armature-frame upon which the laminated rings are built, consisting of an annular yoke divided in a plane at right angles to its axis, the inner face of said yoke between said laminated rings being grooved as at 51 to receive the field-spool, the divided parts being movable away from and toward one another, means for detachably connecting the divided parts of said yoke together, and an axially-movable rotary inductor mounted within said armature for the purpose set forth.

3. An electric generator comprising a rim; a series of segmental sections upon said rim; the adjacent faces of said rim and segmental sections having a series of registering transverse slots; a series of keys of I shape in cross-section adapted to take into said registering slots; and means for retaining said segmental sections against lateral displacement, substantially as and for the purpose set forth.

4. An electric generator comprising a rim having its edges circumferentially grooved; a series of laminated segmental sections built up upon said rim a series of clips recessed adjacent to one end to form flanges to take into the grooved edges of said rim, and the other ends of said clips overlapping the faces of the end laminæ of said segmental sections; and means for retaining said laminated segmental sections against displacement away from said rim, substantially as and for the purpose set forth.

5. In an electric generator, a rim; two annular series of laminated sections built up upon the face of said rim, one series being located adjacent to each edge of said rim, and a circumferential perimetrical groove being formed in the face of said rim adjacent to each series; the series of clips 22 angular in cross-section adapted to extend across the face of the inner laminæ of said laminated segmental section and having their outer lower corners notched to register with one of said perimetrical grooves; the series of keys 25, for preventing the lateral displacement of the laminated sections in one direction; means for preventing lateral displacement thereof in the opposite direction, and means for preventing radial displacement thereof, substantially as and for the purpose set forth.

6. An electric generator or motor, comprising a stationary armature-frame consisting of an annular yoke divided in a plane at right angles to its axis, the divided parts being movable away from and toward one another and formed with annular centripetal extensions at their outer edges, a laminated ring built up upon each of said centripetal extensions, the adjacent faces of said centripetal extensions and laminated rings having a series of registering transverse slots, keys I-shaped in cross-section adapted to take into said registering slots and means for retaining said laminated rings against lateral displacement, for the purpose set forth.

7. An electric generator or motor, comprising a stationary armature-frame consisting of an annular yoke divided in a plane at right angles to its axis, the divided parts being movable away from and toward one another and formed with annular centripetal extensions at their outer edges, said centripetal extensions having their edges circumferentially grooved; a laminated ring built up upon each of said centripetal extensions, means for retaining said laminated rings against centripetal displacement, and a series of clips 47 recessed to form flanges to take into the grooved edges of said yoke, substantially as and for the purpose set forth.

8. An electric generator or motor, comprising a stationary armature-frame consisting of an annular yoke divided in a plane at right angles to its axis, the divided parts being movable away from and toward one another and formed with annular centripetal extensions at their outer edges, said centripetal extensions having their edges circumferentially grooved, a laminated ring built up upon each of said centripetal extensions, the adjacent faces of said centripetal extensions and laminated rings having a series of registering transverse T-slots cut therein, a key I-shaped in cross-section adapted to take into said registering slots; and a series of clips 47 recessed to form flanges to take into the grooved edges of said yoke, substantially as and for the purpose set forth.

In testimony whereof I have affixed my signature in presence of two witnesses.

PHILIP J. DARLINGTON.

Witnesses:
  OWEN N. EVANS,
  WILLIAM P. MCFEAT.